United States Patent [19]
Torii et al.

[11] Patent Number: 5,823,905
[45] Date of Patent: Oct. 20, 1998

[54] MOBILE MEMBER POSITION DETECTION APPARATUS

[75] Inventors: Katsuhiko Torii; Kengo Yamamura, both of Shizuoka-ken; Mitsuhiro Ikeya, Hamamatsu, all of Japan

[73] Assignee: Asmo Co., Ltd., Shizuoka-ken, Japan

[21] Appl. No.: 584,083

[22] Filed: Jan. 11, 1996

[30] Foreign Application Priority Data

Jan. 10, 1995 [JP] Japan .................................. 7-002059

[51] Int. Cl.⁶ ............................................... G01D 5/02
[52] U.S. Cl. ........................ 475/149; 475/158; 475/254; 296/223
[58] Field of Search .................................. 475/149–153, 475/158, 254; 192/143; 296/223, 216

[56] References Cited

U.S. PATENT DOCUMENTS

| | | | |
|---|---|---|---|
| 3,915,034 | 10/1975 | Ward | 475/265 X |
| 3,980,846 | 9/1976 | Yoshida . | |
| 4,133,344 | 1/1979 | Hunter et al. | 475/159 X |
| 4,468,063 | 8/1984 | Yukimoto et al. | 475/158 X |
| 4,606,443 | 8/1986 | Kimura | 475/263 |
| 4,641,551 | 2/1987 | Pascaloff | 475/263 |
| 4,659,141 | 4/1987 | Masuda et al. . | |
| 4,920,784 | 5/1990 | Gonsior . | |
| 5,181,891 | 1/1993 | Pohl et al. | 296/223 X |
| 5,185,562 | 2/1993 | Huyer | 296/223 X |
| 5,188,420 | 2/1993 | Maeda et al. | 296/223 |
| 5,244,068 | 9/1993 | Hattass et al. | 296/223 X |
| 5,250,882 | 10/1993 | Odoi et al. | 296/223 X |

FOREIGN PATENT DOCUMENTS

| | | |
|---|---|---|
| B-359853 | 2/1993 | European Pat. Off. . |
| C-2821543 | 12/1983 | Germany . |
| 59-148586 | 8/1984 | Japan . |
| 2-190587 | 7/1990 | Japan . |
| 5-211747 | 8/1993 | Japan . |

*Primary Examiner*—Rodney H. Bonck
*Assistant Examiner*—Peter T. Kwon
*Attorney, Agent, or Firm*—Hazel & Thomas

[57] ABSTRACT

There is provided a mobile member position detection apparatus in which not only high-accuracy detection of a window glass or the like of a power window apparatus but also setting of an initial position being free from cumbersome adjustment can be realized with a simple structure at low cost. In a position detection apparatus, a ring gear is rotated together with a motor output shaft, and a predetermined rotational position is detected by a mobile contact and a fixed contact. In this case, since a projecting portion of a gear base is brought into contact with a contact surface of a base plate to hold the gear base, a difference between loss torque of the gear base and loss torque of the ring gear increases, and a planetary gear is not unnecessarily revolved. Thereafter, when the output shaft is rotated, holding of the carrier by a wave washer is released, and rotation of the output shaft is not transmitted to the ring gear. Therefore, when the output shaft is sufficiently rotated in an incorporating operation, an initial state can be automatically set.

25 Claims, 15 Drawing Sheets

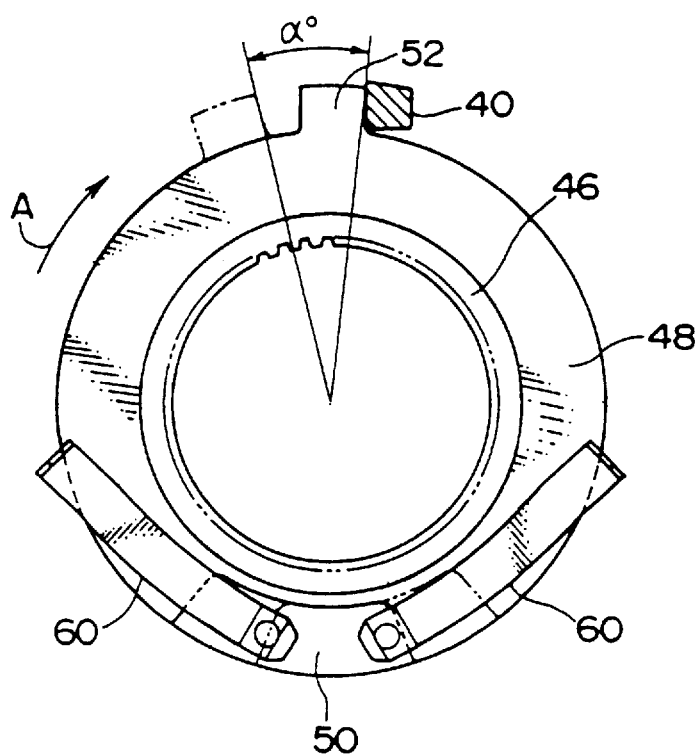

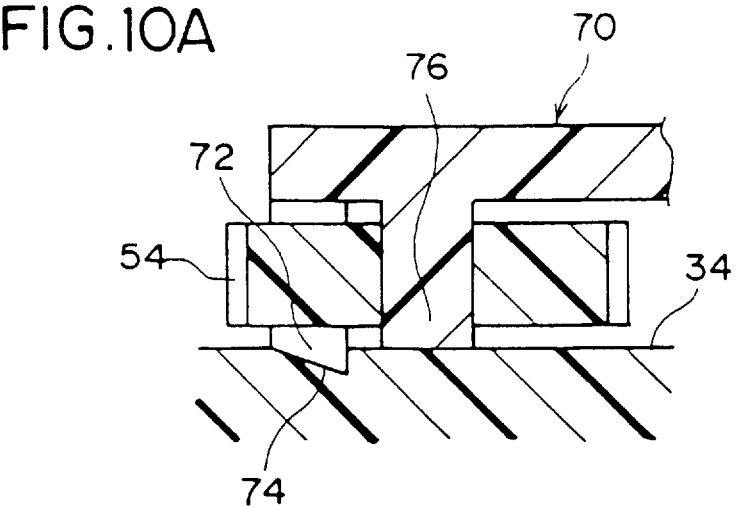
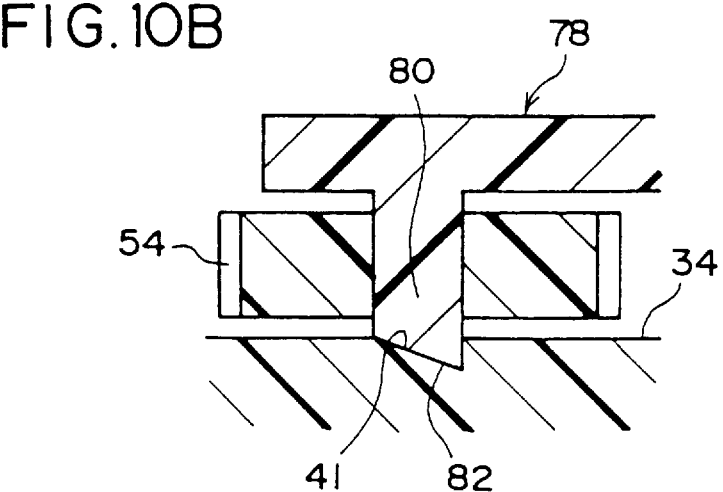
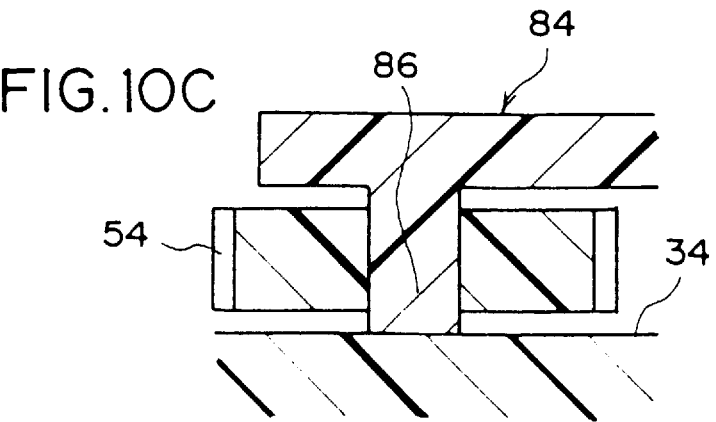

MOBILE MEMBER POSITION DETECTION APPARATUS

BACKGROUND OF THE INVENTION

1. Field of the Invention

The present invention relates to a mobile member position detection apparatus used in a power window apparatus for moving a window glass of a vehicle door to open/close it or a sunroof apparatus for moving a sunroof to open/close it, or the like.

2. Description of the Related Art

A motor is used as a drive source in a power window apparatus for vertically moving a window glass of a vehicle to open/close it or a sunroof apparatus for moving a sunroof to open/close it.

In this case, for example, some power window apparatuses have a so-called catch-in prevention function for preventing passenger's body or a foreign object from unnecessarily being caught in a window glass. In a power window apparatus having such a catch-in prevention function, a limit switch is arranged at a predetermined position of a door, to check, on the basis of a signal from the limit switch and a lock current of a motor to control movement of the window glass, i.e., the rotational position of the motor, or whether a foreign object is caught in the window glass. In another example, a Hall IC or a special commutator is arranged to detect the rotational speed of an armature, and whether a foreign object is caught in the window glass is checked on the basis of the resultant rotational speed detection signal (pulse number or pulse width of a pulse signal) to control the rotational position of the motor.

In such a power window apparatus (mechanism for detecting the rotational position of a motor), when a motor or a window regulator is incorporated, cumbersome adjustment of the incorporation position or cumbersome reset after the incorporation is inevitably required.

More specifically, for example, in the catch-in prevention mechanism constituted on the basis of a lock current of a motor or a signal from a limit switch arranged at a door, the motor or window regulator must be incorporated in a vehicle body in not only a state wherein the vertical position of the window glass corresponds to a predetermined rotational position of a motor rotating shaft, but also a state wherein the limit switch corresponds to a predetermined position of the window glass. For this reason, adjustment of the incorporation position is cumbersome, and a large number of parts are required. In addition, even if the limit switch or the like is set at an optimum position at the initial stage of incorporation, readjustment must be performed each time the window glass is made unstable in subsequent use of the power window apparatus. In addition, in the catch-in prevention mechanism constituted on the basis of the number of revolution detection signal (pulse signal) from the armature, as in the above-mentioned mechanism, even if the motor rotating shaft is initially set in correspondence with the window glass at the initial stage of incorporation, thereafter, when the window glass is made unstable, the positional relationship between the window glass and the motor rotating shaft must be reset again.

In this manner, in the conventional mechanism for detecting the rotational position of a motor used in a power window apparatus, a sunroof apparatus, or the like, cumbersome adjustment of an incorporation position during an incorporating operation or cumbersome reset after the incorporating operation must be performed. In addition, when a catch-in prevention mechanism is constituted, the costs of other parts such as a controller and the like are high, and high accuracy cannot be obtained.

SUMMARY OF THE INVENTION

The present invention has been made in consideration of the above circumstances, and has as its object to provide a mobile member position detection apparatus in which, when the mobile member position detection apparatus is used in a power window apparatus or a sunroof apparatus, not only high-accuracy detection of the position of a window glass or a sunroof and control of its movement, but also setting of an initial position being free from cumbersome adjustment can be realized with a simple structure at low cost, and a range to which the mobile member position detection apparatus is applied is widened.

According to the first embodiment of the present invention, there is provided a mobile member position detection apparatus for detecting a predetermined moving position of a mobile member moving in a forward/backward direction, comprising:

a switch unit which can detect the predetermined moving position of the mobile member on the basis of an ON/OFF-operation of a contact;

a planetary gear combination, having a ring gear and a planetary gear and moved together with the mobile member by moving force transmitted from the mobile member, for causing the ring gear to operate the switch unit at the predetermined moving position of the mobile member:

a clutch mechanism for transmitting the moving force of the mobile member from the planetary gear to the ring gear by preventing revolution of the planetary gear in a normal state to rotate the ring gear, and for making it possible to for the planetary gear to revolve, thereby interrupting transmission of forward torque from the mobile member to the ring gear after the switch unit operates, when the ring gear is rotated in the forward direction by a predetermined amount; and a torque increasing mechanism, arranged in the planetary gear combination, for increasing force for preventing revolution of the planetary gear by the clutch mechanism to increase torque which can be transmitted from the mobile member to the ring gear.

According to the second embodiment of the present invention, there is provided a mobile member position detection apparatus for detecting a predetermined moving position of a mobile member moved between a first position and a second position by drive force from a rotational drive source rotated in a forward/backward direction, comprising:

a switch unit which can detect the predetermined moving position of the mobile member on the basis of an ON/OFF-operation of a contact; and a planetary gear combination, having a ring gear and a planetary gear and moved together with the mobile member by torque transmitted from the rotational drive source, for causing the ring gear to operate the switch unit at the predetermined moving position of the mobile member, said planetary gear combination for transmitting the torque of the rotational drive source from the planetary gear to the ring gear in a normal state by preventing revolution of the planetary gear, and for interrupting the transmission of the forward torque from the rotational drive source to the ring gear by making it possible to revolute the planetary gear to stop rotation of the ring gear, when said ring gear is rotated by a predetermined amount in the forward direction, after said switch unit operates, in the case that said rotational drive source is rotated in the forward direction to move said mobile member to the first position in the forward direction, thereby causing the stop position of the rotation of said ring gear to correspond to the first position of said mobile member.

According to the present invention, in the mobile member position detection apparatus, revolution of a planetary gear is generally prevented. When the rotational drive source moves in a forward/backward direction, this moving force is transmitted to the planetary gear and the ring gear, and the ring gear is rotated together with the rotational drive source. When the mobile member reaches a predetermined moving position, the ring gear operates the switch unit. Therefore, a predetermined moving position of the mobile member is detected.

After the switch unit operates, when the ring gear is rotated in the forward direction by a predetermined amount, it is made possible to revolute the planetary gear, and the transmission of forward torque from the rotational drive source to the ring gear is interrupted. More specifically, once the switch unit operates, when the ring gear is rotated in the forward direction by the predetermined amount, the ring gear of the planetary gear combination does not move to keep the switch unit operating even if the mobile member is moved in the forward direction. In other words, once the mobile member is sufficiently moved in the forward direction, the mobile member position detection apparatus is automatically set in the initial state wherein the switch unit is operated.

Therefore, for example, when this position detection apparatus is used in a vehicle power window apparatus having a catch-in prevention function or in a drive motor therefor, once the output shaft of the motor is sufficiently rotated in the forward direction when the position detection apparatus is installed in the vehicle body, the position detection apparatus is automatically set in the initial state wherein the switch unit is operated. For this reason, the initial position can be easily set without cumbersome adjustment of the incorporation position during the incorporating operation and cumbersome reset after the incorporating operation.

In addition, in a position detection apparatus having an arrangement in which the number of revolution of the armature of a motor for driving a power window apparatus is detected by using a Hall IC or the like to detect the motor rotating shaft, i.e., the moving position of the window glass, a control circuit therefor inevitably requires a counter. However, the position detection apparatus according to the present invention can determine a correct position on the basis of only one ON/OFF signal, the control circuit does not require a counter, and the position detection apparatus can be manufactured at low cost.

The mobile member position detection apparatus according to the present invention preferably comprises a torque increasing mechanism. When the mobile member position detection apparatus comprises the torque increasing mechanism, in a normal state set while the revolution of the planetary gear of the planetary gear combination is prevented to move the ring gear together with the mobile member, force for preventing revolution of the planetary gear is increased, torque which can be transmitted from the rotational drive source to the ring gear is increased.

Therefore, in the normal state, the planetary gear is not undesirably revolved by vibration or the like, and transmission of moving force to the ring gear (moving together with the ring gear) in the normal state can be reliably performed, and the switch unit can be accurately operated.

In the arrangement of the above-described mobile member position detection apparatus, when the ring gear moves together with the mobile member to reach a predetermined rotational position, a stopper portion provided on the ring gear of the planetary gear combination is brought into contact with a projection arranged at a position where the ring gear is rotated from the arrangement position of the switch unit in the forward direction by a predetermined amount. Therefore, it is made possible to revolute the planetary gear, and transmission of forward torque to the ring gear can be interrupted.

In this case, the stopper portion can change its arrangement position. When the arrangement position of the stopper portion is changed, timings at which a torque transmission interruption state (state wherein rotation of the ring gear is prevented to make it possible to revolute the planetary gear) is set can be individually changed.

Therefore, the mobile member position detection apparatus can be easily applied to a power window apparatus, a sunroof apparatus, or the like of each of different types of vehicles (in other words, even if set detection positions which are detected by the switch unit are different). The set detection position of the mobile member detected by the switch unit can be arbitrarily changed, and a range to which the mobile member position detection apparatus is applied is widened, thereby reducing costs.

In the arrangement of the above-described mobile member position detection apparatus, for example, when the ring gear moves together with the mobile member to reach a predetermined rotational position, the cam portion arranged on the ring gear is engaged with the switch unit to operate the switch unit. Therefore, a rotational position of the mobile member can be detected.

In this case, the switch unit is arranged independently of the planetary gear combination, and the switch unit is operated by the cam portion arranged on the ring gear. For this reason, the switch unit can be operated without an influence of friction, vibration, or the like due to movement of the ring gear, and a conduction failure due to chattering, a shift of the set position, vibration, or the like can be prevented.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein:

FIG. 9 is a plan view showing the correspondence relationship between a fixed contact and movable contacts and the correspondence relationship between a stopper portion and a projection of the position detection apparatus according to the first embodiment of the present invention;

FIGS. 10A, 10B, and 10C are sectional views showing other gear bases applied to the position detection apparatus according to the first embodiment of the present invention;

DETAILED DESCRIPTION OF THE PREFERRED EMBODIMENTS (First Embodiment)

Figure 2:
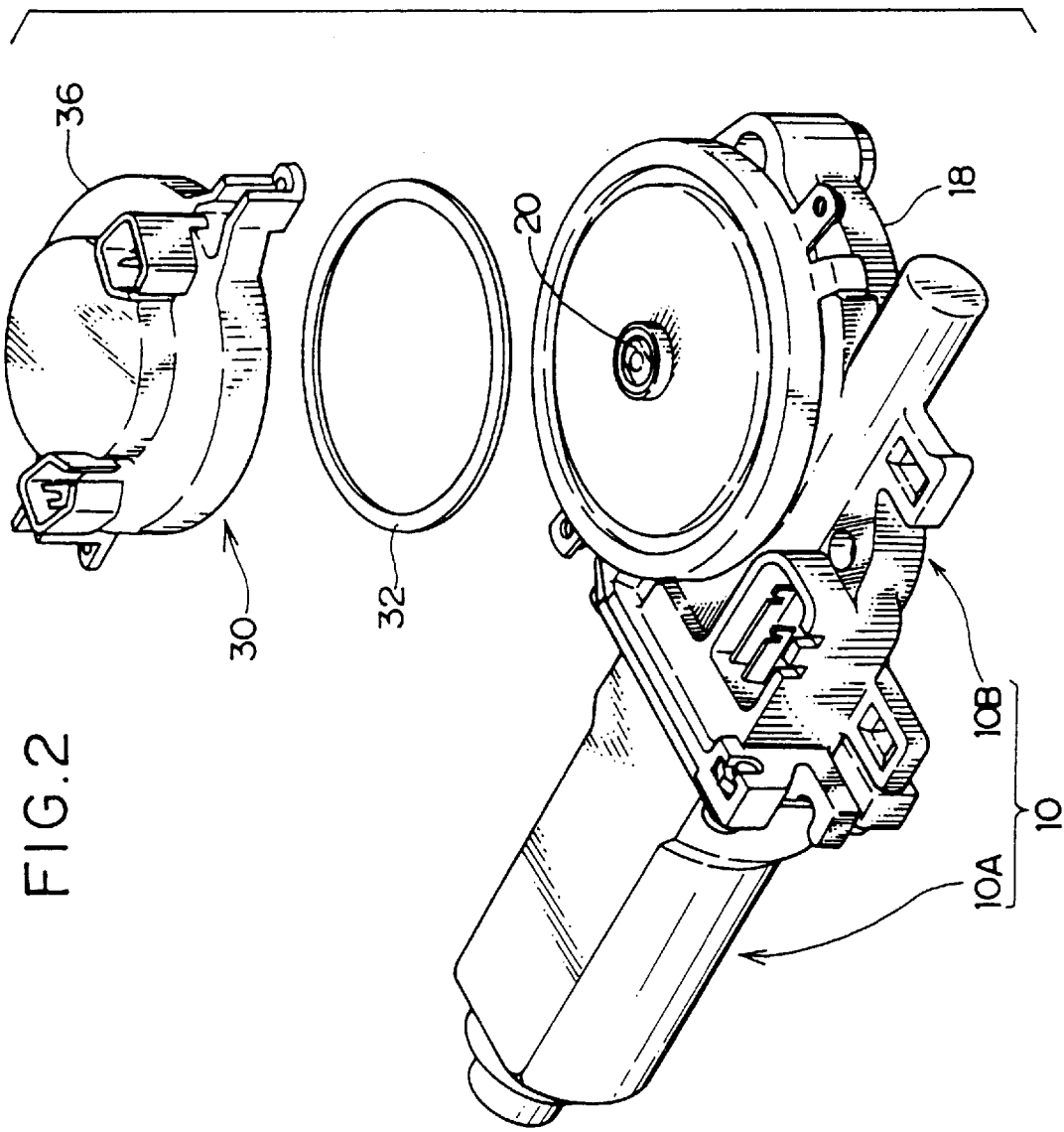
FIG. 2 is a perspective view showing the whole of a motor for a power window apparatus in which the position detection apparatus according to the first embodiment of the present invention is applied.
Figure 3:
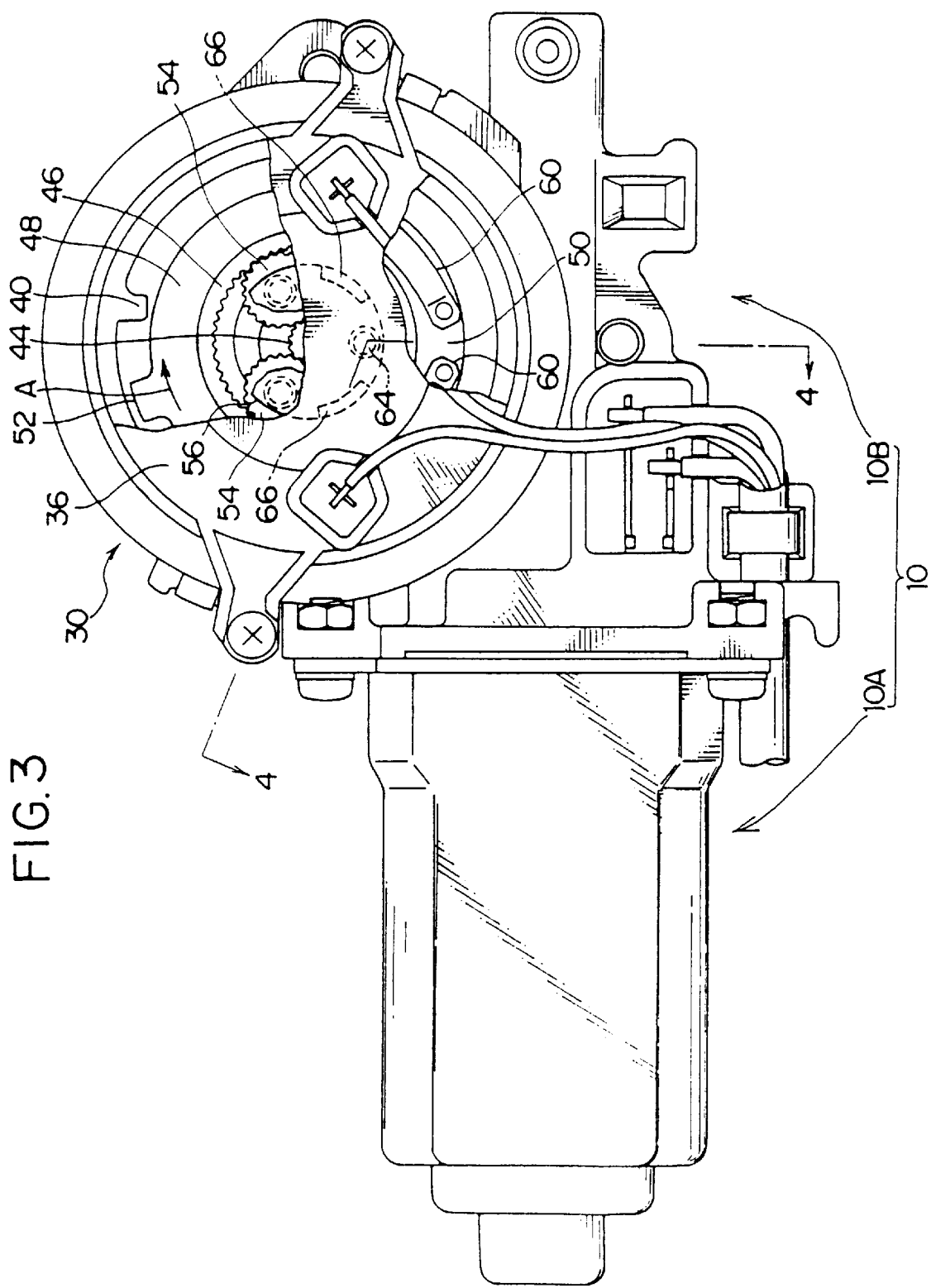
FIG. 3 is a partially cutaway plan view showing the motor for the power window apparatus to which the position detection apparatus according to the first embodiment of the present invention is applied.
Figure 4:
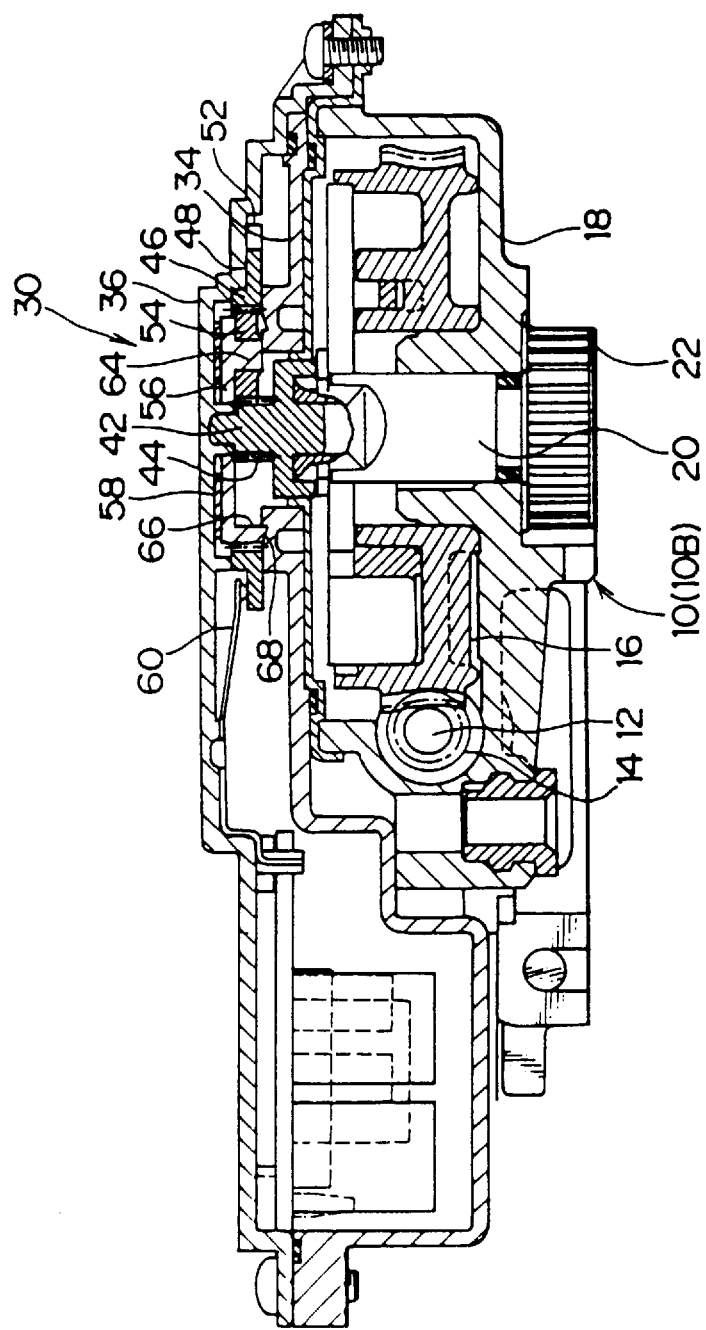
FIG. 4 is a sectional view taken along a 4—4 line in FIG. 3 showing the motor for the power window apparatus to which the position detection apparatus according to the first embodiment of the present invention is applied.

FIG. 2 is a perspective view showing the whole of a motor 10 for a power window apparatus to which a position detection apparatus 30 according to the first embodiment of the present invention is applied. FIG. 3 is a partially cutaway plan view showing the motor 10, and FIG. 4 is a sectional view taken along a 4—4 line in FIG. 3 showing the motor 10.

The motor 10 is constituted by a motor unit 10A and a gear unit 10B connected to the motor unit 10A. A rotating shaft 12 of the motor unit 10A extended into the gear unit 10B, and a worm gear 14 is formed at the tip of the rotating shaft 12. This worm gear 14 is meshed with a rotational gear wheel 16 provided in the gear unit 10B.

The rotational gear wheel 16 has a shaft 20 serving as a motor output shaft rotatably supported by a cover 18 of the gear unit 10B. Accordingly, when the motor unit 10A operates to rotate the rotating shaft 12, this torque is transmitted to the rotational gear wheel 16 through the worm gear 14 to rotate the shaft 20. A pinion 22 is attached to the tip of the shaft 20. The pinion 22 is meshed with a rack (not shown) of a window regulator. In this case, according to this embodiment, it is set that a window glass moves by one stroke each time, e.g., the shaft 20 (pinion 22) is rotated 3 to 3.5 times.

The position detection apparatus 30 is attached, through a gasket 32, to the rotational gear wheel 16 on the side opposing the surface to which the pinion 22 of the shaft 20 is attached.

Figure 1:
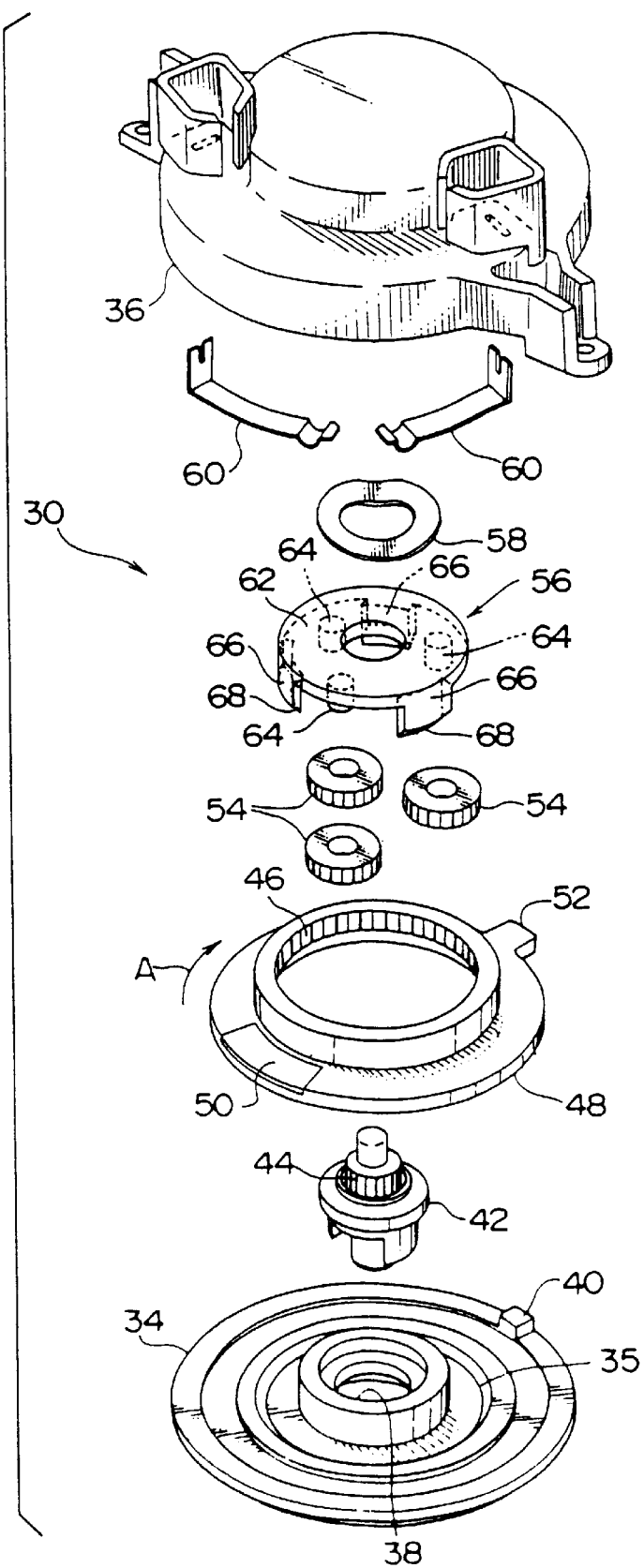
FIG. 1 is an exploded perspective view of a position detection apparatus according to the first embodiment of the present invention.

As shown in FIG. 1 in detail, the position detection apparatus 30 comprises a base plate 34 and a cover plate 36, and has substantially a cylindrical shape constituted by the base plate 34 and the cover plate 36. A through hole 38 is formed in the central portion of the base plate 34, and a projection 40 is formed at a portion of the periphery of the base plate 34 to extend in the axial direction.

Position detection apparatus 30 comprises a connection shaft 42. This connection shaft 42 has one end integrally connected to the shaft 20 of the rotational gear wheel 16, and is always rotated together with the shaft 20. The other end extends into the position detection apparatus 30 (base plate 34 and cover plate 36) through the through hole 38 formed in the base plate 34. A sun gear 44 constituting a planetary gear combination is provided near the other end of the connection shaft 42 and meshed with planetary gears 54 (to be described later).

A ring gear 46 constituting the planetary gear combination is arranged on the side of the base plate 34, i.e., around the connection shaft 42, such that the ring gear 46 opposes the sun gear 44. A flange portion 48 is integrated with the end portion of the ring gear 46 on the base plate 34 side, and the flange portion 48 is rotatably accommodated in the base plate 34. The flange portion 48 has a mobile contact 50 formed thereon. The mobile contact 50 is a conducting plate formed in the form of an arc and adheres to the flange portion 48 to have substantially the same plane as that of the flange portion 48. A stopper portion 52 is formed to be projected from a portion of the periphery of the flange portion 48. This stopper portion 52 corresponds to the projection 40 formed on the base plate 34 described above. When the ring gear 46 (flange portion 48) is rotated in a forward direction (the direction of an arrow A in FIGS. 1 and 3) to reach a predetermined rotational position, the stopper portion 52 is brought into contact with the projection 40 to prevent further rotation of the ring gear 46 in the forward direction.

Figure 5:
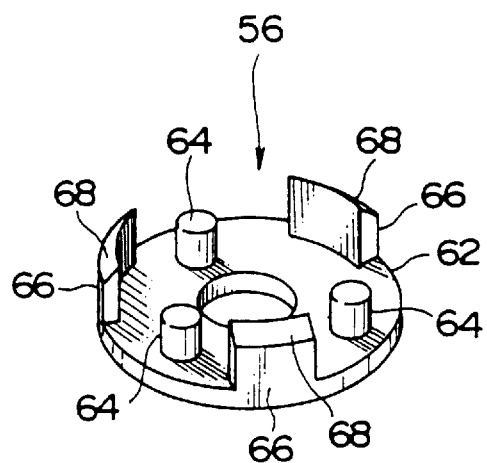
FIG. 5 is a perspective view showing a gear base applied to the position detection apparatus according to the first embodiment of the present invention.
Figure 6:
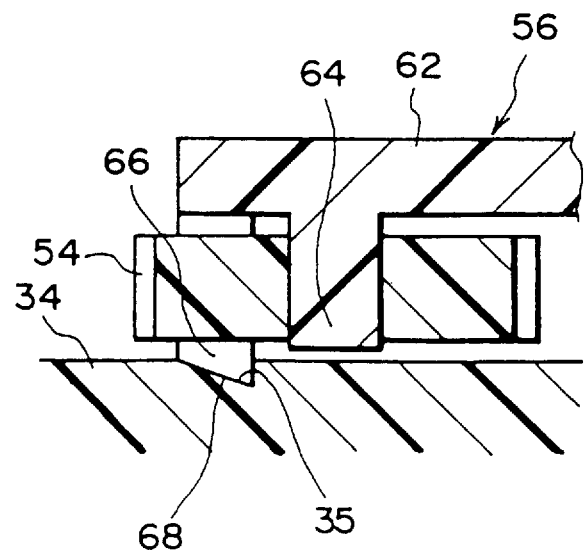
FIG. 6 is a sectional view showing an arrangement state of a gear base and a planetary gear applied to the position detection apparatus according to the first embodiment of the present invention.
Figure 7:
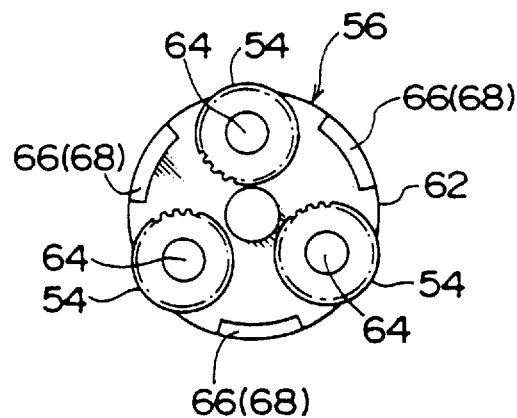
FIG. 7 is a plan view showing an incorporation state of the gear base and the planetary gear which are applied to the position detection apparatus according to the first embodiment of the present invention.
Figure 8:
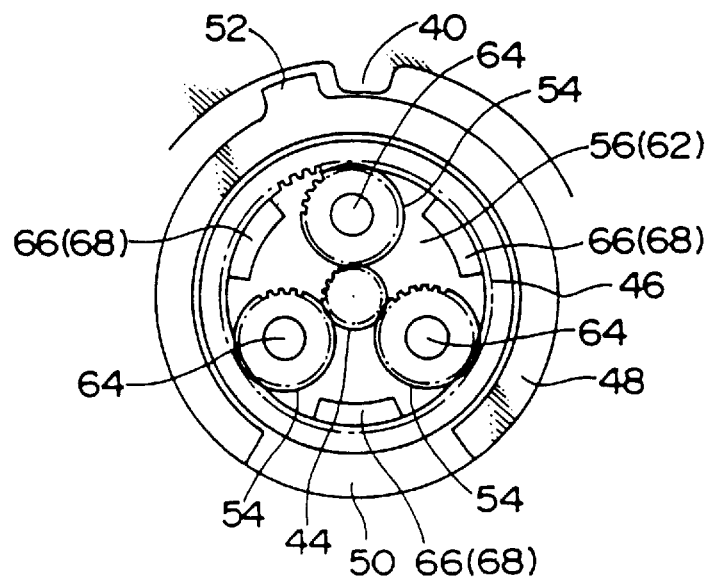
FIG. 8 is a plan view showing an incorporation state of the gear base, the planetary gear, and a ring gear which are applied to the position detection apparatus according to the first embodiment of the present invention.

Three planetary gears 54 are arranged between the inner peripheral portion of the ring gear 46 and the sun gear 44. These planetary gears 54 are rotatably supported by a gear base 56. In this case, FIG. 5 shows the details of the gear base 56 by using a perspective view. In the gear base 56, three support shaft portions 64 extending from a disk-like main unit 62 are formed. As shown in FIGS. 6 and 7, each planetary gear 54 is supported by the respective support shaft portion 64. As shown in FIG. 8, each planetary gear 54 is meshed with the ring gear 46 and the sun gear 44. More specifically, the sun gear 44, the ring gear 46, and the planetary gears 54 constitute a planetary gear combination, so that rotation of the connection shaft 42 (i.e., the shaft 20) can be transmitted while reducing its rotational speed. For example, when the gear base 56 is held to prevent revolution of the planetary gears 54, rotation of the connection shaft 42 (i.e., shaft 20) can be transmitted to the ring gear 46 while reducing the rotational speed of the connection shaft 42.

In this embodiment, the reduction gear ratio of the planetary gear combination constituted by the sun gear 44, the ring gear 46, and the planetary gears 54 is set to be 4:1. The ring gear 46 is designed so as not to be rotated more than one revolution while a window glass moves by one stroke (while the sun gear 44 is rotated 3 to 3.5 times). The reduction gear ratio of the planetary gear combination is not limited to 4:1. The reduction gear ratio can be arbitrarily set.

In addition, in the gear base 56, three projecting portions 66 serving as a torque increasing mechanism are formed on the periphery of the disk-like main unit 62. As shown in FIG. 6, the projecting portions 66 are formed to extend in the same direction as that of the support shaft portions 64, the height of each projecting portion 66 being set to be larger than the height of each support shaft portion 64. An inclined surface 68 is formed on the tip of each projecting portion 66, and corresponds to a contact surface 35 formed on the base plate 34 described above. More specifically, the gear base 56 is held in such a state that the inclined surfaces 68 of the projecting portions 66 is in contact with the contact surface 35 of the base plate 34. The inclination of the inclined surface 68 of each projecting portion 66 is preferably set to be 5° or more.

A wave washer 58 constituting a clutch mechanism is provided between the gear base 56 and the cover plate 36 for covering the planetary gear combination constituted by the sun gear 44, the ring gear 46, the planetary gears 54, and the gear base 56 which are arranged as described above. Since the wave washer 58 always presses the gear base 56, rotation of the gear base 56 is prevented by holding the gear base 56 in such a state that the inclined surfaces 68 of the projecting portions 66 are in contact with the contact surface 35 of the base plate 34, and the planetary gears 54 are held in such a state that revolution of the planetary gears 54 is prevented. On the other hand, when the stopper portion 52 of the flange portion 48 of the ring gear 46 is brought into contact with the projection 40 to prevent further rotation of the ring gear 46 in the forward direction, the torque in the forward direction of the sun gear 44 exceeding the pressing force (holding force) of the gear base 56 causes the wave washer 58 to release the holding state of the gear base 56, thereby making it possible to revolute the planetary gears 54. More specifically, after the stopper portion 52 of the flange portion 48 is brought into contact with the projection 40, the wave washer 58 can interrupt transmission of forward torque from the sun gear 44 (shaft 20) to the ring gear 46. Accordingly, in a state wherein the stopper portion 52 is brought into contact with the projection 40 to prevent rotation of the ring gear 46, when the sun gear 44 (shaft 20) is rotated in the forward direction (direction to rotate the ring gear 46 in the forward direction), only the planetary gears 54 are revolved together with the gear base 56.

A pair of fixed contacts 60 are attached to the cover plate 36. The fixed contacts 60 are a pair of contact plates having elasticity. One end of each fixed contact 60 is fixed on the cover plate 36, and the tip of each fixed contact 60 extends to the flange portion 48 of the ring gear 46 to be brought into elastic contact with the flange portion 48. The fixed contacts 60 are brought into contact with the mobile contact 50 when the ring gear 46 reaches a predetermined rotational position. The fixed contacts 60 and the mobile contact 50 are electrically connected to a control circuit for the power window apparatus. The mobile contact 50 is brought into contact with the pair of fixed contacts 60 to be set in an ON state, so that the rotational position of the ring gear 46, i.e., the rotational position of the sun gear 44, i.e., the rotational position of the shaft 20 can be detected. The fixed contacts 60 and the mobile contact 50 are used in rotational control (to be described later) of the motor 10.

In this embodiment, as shown in FIG. 9 in detail, for example, when the window glass moves upward from an open state to reach a position being 4 mm apart from an upper end stop position in the downward direction, the stopper portion 52 reaches a position apart from the position where the stopper portion 52 is brought in contact with the projection 40, by a rotation angle of a° in the upstream direction. At this time, the mobile contact 50 is brought into contact with the pair of fixed contacts 60 to be an ON state (an electrical continuity state). Thereafter, sizes and the like of respective parts are set such that this ON state (state wherein the mobile contact 50 is in contact with the pair of fixed contacts 60) is kept until the stopper portion 52 is brought into contact with the projection 40.

In contrast to the above, the positions may be detected in the following manner. That is, when the window glass moves upward form the open state to reach the position being 4 mm apart from the upper end stop position in the downward direction, and the stopper portion 52 reaches a position shifted from a position where the stopper portion 52 is in contact with the projection 40 by a rotation angle of a° on an upstream side, the mobile contact 50 is brought into contact with the pair of fixed contacts 60 to be an OFF state (an electrical non-continuity state) so that the position detection can be achieved. In addition, after the state has been attained as described above, this ON/OFF state is not necessarily electrically maintained. A trigger signal generated when the mobile contact 50 is brought into contact with the pair of fixed contacts 60 may be detected to check whether the position detection apparatus reaches a predetermined rotational position.

The operation of this embodiment will be described with a case wherein an upward moving switch of the power window apparatus is operated to move the window glass upward.

In the motor 10 and the position detection apparatus 30 which are arranged as described above, when the upward moving switch of the power window apparatus is operated, the motor 10 operates to rotate the shaft 20, thereby operating a window regulator so that the window glass is moved upward.

In this case, the gear base 56 is pressed by the wave washer 58 to be held in a normal state (during upward moving of the window glass), revolution of the planetary gears 54 is prevented. Therefore, with rotation of the shaft 20, the torque of the connection shaft 42 (i.e., the sun gear 44) is transmitted to the ring gear 46 through the planetary gears 54 while reducing the rotational speed of the connection shaft 42, and the ring gear 46 is gradually rotated in the forward direction.

Next, the position detection apparatus 30 detects whether the motor 10 reaches a predetermined rotational position, i.e., whether the window glass reaches a predetermined position (position being 4 mm apart from the upper end stop position in the downward direction).

More specifically, in the position detection apparatus 30, with rotation of the shaft 20, the torque of the connection shaft 42 (i.e., the sun gear 44) is transmitted to the ring gear 46 through the planetary gears 54 with a reduced rotational speed, and the ring gear 46 is gradually rotated in the forward direction. However, if the window glass which is moving upward does not reach the position being 4 mm apart from the upper end stop position in the downward direction, the stopper portion 52 is largely spaced from the projection 40, and the mobile contact 50 are apart from the pair of fixed contacts 60 in a non-contact state. Therefore, the rotational position of the shaft 20 (state wherein the window glass does not reach the position being 4 mm apart from the upper end stop position in the downward direction) is detected. In this case, while the operation of the motor 10 is continued, it is checked on the basis of a lock current or the like of the motor 10 whether a foreign object is caught. When it is detected that a foreign object is caught, the motor 10 is rotated in the reverse direction to move the window glass downward.

When the window glass moves upward to reach the position being 4 mm apart from the upper end stop position in the downward direction, as shown in FIG. 9, the stopper portion 52 reaches the position shifted from a position where the stopper portion 52 is in contact with the projection 40 by the rotation angle of a° on the upstream side. At this time, the mobile contact 50 is brought into contact with the fixed contacts 60 to be an ON state, thereby detecting the rotational position of the shaft 20 (state wherein the window glass has reached the position being 4 mm apart from the upper end stop position in the lower direction).

Even if it is detected that the shaft 20 of the motor 10 has reached a predetermined rotational position, i.e., that the window glass has reached the predetermined position, the operation of the motor 10 is continued. In this case, although the relative contact positions between the mobile contact 50 and the pair of fixed contacts 60 are changed by rotation of the ring gear 46, the ON state (state wherein the mobile contact 50 is in contact with the pair of fixed contacts 60) is maintained.

Thereafter, it is checked whether the window glass is completely closed on the basis of the lock current and the like of the motor 10. When the closed state of the window glass is detected, the motor 10 is stopped.

In this manner, in the position detection apparatus 30, the rotational position, i.e., the position of the window glass (whether the window glass has reached the position being 4 mm apart from the upper end stop position in the downward direction) can be detected at a high accuracy by the pair of fixed contacts 60 and the mobile contact 50 rotated together with the ring gear 46.

In this case, in the position detection apparatus 30, once the shaft 20 of the motor 10 is sufficiently rotated in the forward direction when the position detection apparatus 30 is installed in the vehicle body, an initial state wherein the mobile contact 50 is in contact with the fixed contacts 60 is automatically set.

More specifically, once the shaft 20 of the motor 10 is sufficiently rotated in the forward direction when the position detection apparatus 30 is installed in the vehicle body, the stopper portion 52 of the flange portion 48 of the ring gear 46 is brought into contact with the projection 40 to prevent further rotation of the ring gear 46 in the forward direction. In this state, when the shaft 20 is rotated further, the torque of the sun gear 44 exceeding the pressing force (holding force) of the gear base 56 causes the wave washer 58 to release the holding state of the gear base 56, thereby making it possible to revolute the planetary gears 54. More specifically, after the stopper portion 52 of the flange portion 48 is brought into contact with the projection 40, the wave washer 58 can interrupt transmission of forward torque from the sun gear 44 (shaft 20) to the ring gear 46. Accordingly, in a state wherein the stopper portion 52 is brought into contact with the projection 40 to prevent rotation of the ring gear 46, when the sun gear 44 (shaft 20) is rotated in the forward direction (direction to rotate the ring gear 46 in the forward direction), only the planetary gears 54 are revolved. Therefore, after the mobile contact 50 is brought into contact with the fixed contacts 60, the stopper portion 52 is brought into contact with projection 40. Thereafter, even if the shaft 20 of the motor 10 is rotated in the forward direction, the ring gear 46 does not move so that the contact state between the mobile contact 50 and the fixed contacts 60 is maintained. That is, once the shaft 20 of the motor 10 is sufficiently rotated in the forward direction, the initial state wherein the stopper portion 52 is in contact with the projection 40 and the mobile contact 50 is in contact with the fixed contacts 60 is automatically set.

In other words, since the position detection apparatus 30 can mechanically store the position being a predetermined distance (4 mm in this embodiment) from the completely close position (maximum upper moving limit) of the window glass without checking whether the window glass reaches the completely close position (maximum upper moving limit) (because detection is performed with reference to the position being 4 mm apart from the completely close position), movement of the window glass can be reliably controlled without an error. For example, in a conventional arrangement in which the moving position of the window glass is detected by detecting the number of revolution of the armature of a motor, reset is performed with reference to the completely close position of the window glass. However, if the window glass is stopped before reaching the true maximum upper moving limit because of a decrease in power supply voltage or an increase in frictional resistance between the window glass and a window frame or the like, reset is performed in such a manner that the false stop position is regarded as the completely close position. Accordingly, in this case, the drive control of the motor is performed with reference to the false close position of the window glass, and an error considerably increases. In contrast to this, in the position detection apparatus 30, even if the window glass is stopped before reaching the true completely close position (maximum upper moving limit), the true completely close position is reliably detected when the window glass passes through the position being 4 mm apart from the true full-open position. Therefore, moving control of the window glass can be reliably performed without an error. In particular, in a wire type window regulator apparatus, an error of moving position control due to looseness of a wire is large. However, when the position detection apparatus 30 is used, the error due to looseness of the wire can be absorbed, and the moving position can be controlled at a high accuracy.

In this manner, in the position detection apparatus 30, once the shaft 20 of the motor 10 is sufficiently rotated in the forward direction when the position detection apparatus 30 is installed in the vehicle body, the initial state wherein the stopper portion 52 is in contact with the projection 40 and the mobile contact 50 is in contact with the fixed contacts 60 is automatically set. Therefore, an initial position can be easily set without cumbersome adjustment of an incorporation position during an incorporating operation or cumbersome reset after the incorporating operation. In addition, moving control of the window glass can be reliably performed without an error.

Furthermore, in position detection apparatus 30 provided with the torque increasing mechanism, the projecting portions 66 are formed on the gear base 56, and the gear base 56 is held in such a state that the inclined surfaces 68 are in contact with the contact surface 35 of the base plate 34. For this reason, force for preventing revolution of the planetary gears 54 is increased. More specifically, with the above-described arrangement, loss torque (difficulty in revolution) inherent in the gear base 56 is increased to be considerably larger than that of the ring gear 46. In particular, since the inclined surfaces 68 of the projecting portions 66 are in contact with the contact surface 35 of the base plate 34, the wedge effect between the inclined surfaces 68 and the contact surface 35 increase the loss torque of the gear base 56. As a result, the difference between the loss torque of the gear base 56 and the loss torque of the ring gear 46 considerably increases.

For this reason, transmittable torque of the forward rotation from the sun gear 44 (shaft 20) to the ring gear 46 generated until the stopper portion 52 of the ring gear 46 is brought into contact with the projection 40 to prevent further rotation of the ring gear 46 in the forward direction (in a state wherein the ring gear 46 is moved together with the shaft 20) is increased.

Therefore, in the above normal state, the planetary gears 54 are not unnecessarily revolved by, e.g., vibration or the like, and transmission of torque from the sun gear 44 (shaft 20) to the ring gear 46 (the ring gear 46 moved together with the shaft 20) can be reliably performed. The mobile contact 50 can be reliably brought into contact with the fixed contacts 60, thereby reliably operating the position detection apparatus 30.

In addition, since an arrangement in which only the spring force of the wave washer 58 is increased to increase the loss torque of the gear base 56 is not employed, the gear base 56 is not scratched (scratch or the like caused by pressing), or dust is not formed by scratching. The ring gear 46 or the planetary gears 54 are not worn or locked by the dust.

In the above embodiment, as shown in FIG. 6, the height of the projecting portions 66 serving as the torque increasing mechanism is higher than that of the support shaft portions 64, and the inclined surfaces 68 are formed at the tips of the projecting portions 66 to be in contact with the contact surface 35 of the base plate 34, thereby holding the projecting portions 66. However, the torque increasing mechanism is not limited to the above arrangement.

For example, the tips of the projecting portions 66 of the gear base 56 may be directly brought into contact with the base plate 34 without forming the inclined surfaces 68. Other portions of the gear base 56 may be brought into contact with the base plate 34. For example, like a gear base 70 shown in FIG. 10A, not only a projecting portion 72 (inclined surface 74) but also a support shaft portion 76 are brought into contact with the base plate 34. In addition, for example, like a gear base 78 shown in FIG. 10B, the following arrangement may be employed. Only a support shaft portion 80 is provided without arranging the projecting portions 66, the projecting portion 72, and the like, an inclined surface 82 is formed at the tip of the support shaft portion 80, and the inclined surface 82 is brought into contact with a contact surface 41 of the base plate 34. Like a gear base 84 shown in FIG. 10C, the tip portion of a support shaft portion 86 may be directly brought into contact with base plate 34 without forming such an inclined surface 82.

In addition, surface treatment such as knurling or the like may be applied to the inclined surfaces 74 and 82 or the tips of the support shaft portions 76 and 86 as described above to increase frictional force. In short, a contact portion, i.e., a clutch unit, may be formed between the gear base and the base plate.

In these cases, the loss torque of the gear base 56 increases, thereby considerably increasing the difference between the loss torque of the gear base 56 and the loss torque of the ring gear 46. Therefore, the planetary gears 54 are not unnecessarily revolved in the above normal state, the ring gear 46 is reliably moved together with the sun gear 44 (shaft 20), and the mobile contact 50 is reliably brought into contact with the fixed contacts 60, thereby accurately operating the position detection apparatus.

Other embodiments of the present invention will be described below. The same reference numerals as in the first embodiment basically denote the same parts in the following embodiments, and a description thereof will be omitted.

(Second Embodiment)

Figure 11:
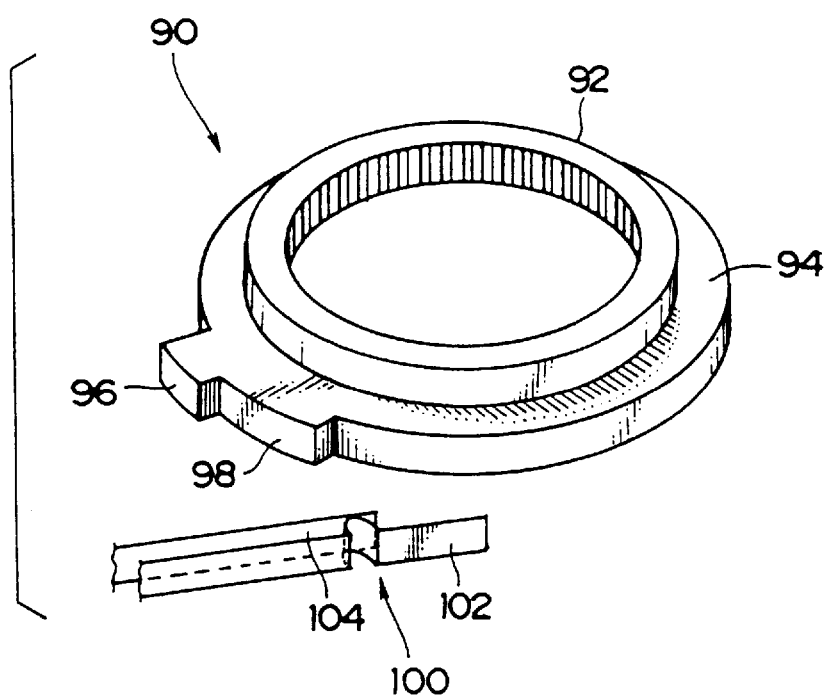
FIG. 11 is a perspective view showing a ring gear and a limit switch which are applied to the position detection apparatus according to the second embodiment of the present invention.

FIG. 11 shows a ring gear 92 constituting a planetary gear combination applied to a position detection apparatus 90 according to the second embodiment.

A stopper portion 96 is formed to extend from a portion of the periphery of a flange portion 94. This stopper portion 96 corresponds to the projection 40 formed on the base plate 34 described above. When the ring gear 92 (flange portion 94) is rotated in a forward direction to reach a predetermined rotational position, the stopper portion 96 is brought into contact with the projection 40 to prevent further rotation of the ring gear 92 in the forward direction. A cam portion 98 is formed to extend from the flange portion 94 on the side of the stopper portion 96 and to be connected to the stopper portion 96. This cam portion 98 can be engaged with a limit switch 100.

The limit switch 100 is constituted by a terminal 102 and a terminal 104 and provided independently of the ring gear 92.

Figure 12:
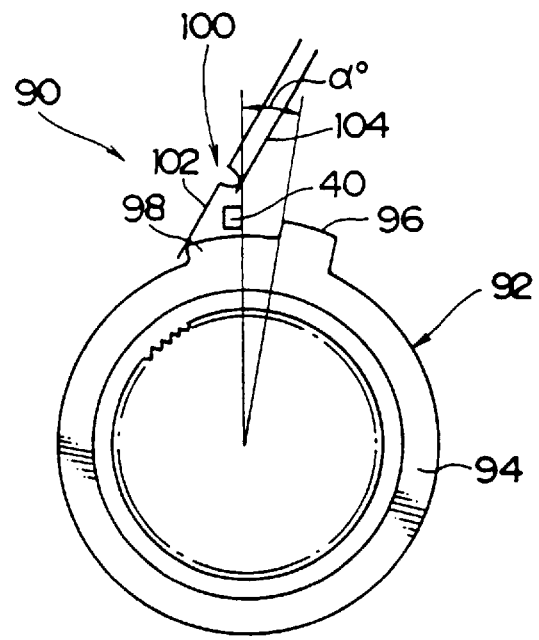
FIG. 12 is a plan view showing the correspondence relationship between a cam portion and the limit switch and the correspondence relationship between a stopper portion and a projection of the position detection apparatus according to the second embodiment of the present invention.

In the second embodiment, for example, as shown in FIG. 12 in detail, when a window glass moves upward to reach a position being 4 mm apart from an upper end stop position in the downward direction, the stopper portion 96 reaches the position shifted from a position where the stopper portion 96 is in contact with the projection 40 by s rotational angle of a° on an upstream side. At this time, the cam portion 98 is brought into contact with the terminal 102 of the limit switch 100 to be apart from the other terminal 104, thereby setting an OFF state. Thereafter, dimensions and the like of respective parts are set such that this OFF state (non-contact state between the terminal 102 and the terminal 104) is maintained until the stopper portion 96 is brought into contact with the projection 40.

In contrast to the above, the positions may be detected in the following manner. That is, when the window glass moves upward to reach the position being 4 mm apart from the upper end stop position in the downward direction, and the stopper portion 96 reaches the position shifted from the position where the stopper portion 96 is in contact with the projection 40 by the rotational angle of a° on the upstream side, the terminal 102 is brought into contact with the terminal 104 to be an ON state. In addition, after the ON/OFF state is set as described above, this ON/OFF state is not necessarily electrically maintained. A trigger signal generated when the terminal 102 is apart from (or brought into contact with) the terminal 104 may be detected to check whether the position detection apparatus reaches a predetermined rotational position.

This embodiment is not limited to the above arrangement in which the limit switch 100 is constituted the pair of terminals 102 and 104. In this embodiment, an ordinary limit switch having a contact portion may be used in this embodiment.

In the ring gear 92 of the position detection apparatus 90 according to the second embodiment, when the window glass moves upward to reach the position being 4 mm apart from the upper end stop position in the downward direction, as shown in FIG. 12, the stopper portion 96 reaches the position shifted from a position where the stopper portion 96 is in contact with the projection 40 by s rotational angle of a° on an upstream side. At this time, the cam portion 98 is engaged with the terminal 102 of the limit switch 100 to cause the terminal 102 to be apart from the terminal 104, thereby setting the terminal 102 and the terminal 104 in an OFF state. Therefore, the rotational position of the shaft 20 (state wherein the window glass reaches the position being 4 mm apart from the upper end stop position in the downward direction) is detected.

In this manner, in the position detection apparatus 90, the cam portion 98 of the ring gear 92 is brought into contact with the terminal 102 of the limit switch 100 to set an OFF state, so that the rotational position of the shaft 20, i.e., the position of the window glass (whether the window glass reaches the position being 4 mm apart from the upper end stop position in the downward direction) can be detected with a high accuracy.

In this case, in the position detection apparatus 90, once a motor 10 is fully rotated in the forward direction when the position detection apparatus 90 is installed in the vehicle body, an initial state wherein the cam portion 98 of the ring gear 92 is in contact with the limit switch 100 (terminal 102) can be automatically set.

Figure 13:
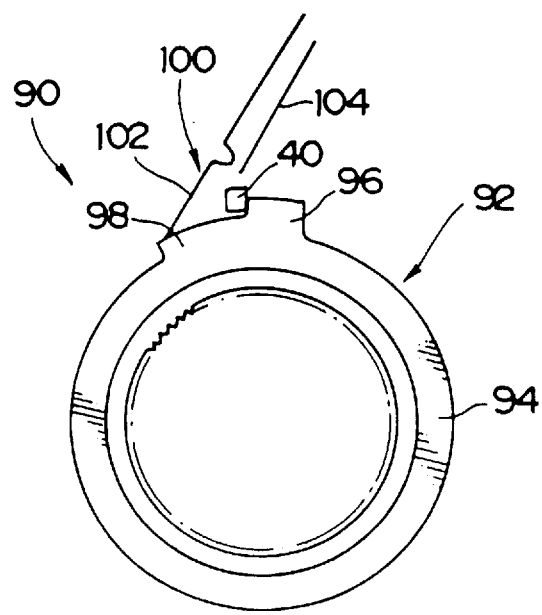
FIG. 13 is a plan view showing the correspondence relationship between the cam portion and the limit switch and the correspondence relationship between the stopper portion and the projection of the position detection apparatus according to the second embodiment of the present invention.

More specifically, once the shaft 20 of the motor 10 is sufficiently rotated in the forward direction when the position detection apparatus 90 is installed in the vehicle body, the stopper portion 96 of the ring gear 92 is brought into contact with the projection 40 to prevent further rotation of the ring gear 92 in the forward direction. In this state, when the shaft 20 is rotated further, the torque of a sun gear 44 exceeding the pressing force (holding force) of a gear base 56 causes a wave washer 58 to release the holding state of the gear base 56, thereby making it possible to revolute the planetary gears 54. For this reason, only the planetary gears 54 are revolved. Therefore, after the cam portion 98 is brought into contact with the terminal 102 to set an OFF state, and the stopper portion 96 is brought into contact with the projection 40, even if the shaft 20 of the motor 10 is rotated in the forward direction, the ring gear 92 does not move to keep the non-contact state between the terminal 102 and the terminal 104 as shown in FIG. 13, and the initial state is automatically set.

In this manner, in the position detection apparatus 90, once the shaft 20 of the motor 10 is sufficiently rotated in the forward direction when the position detection apparatus 90 is installed in the vehicle body, the initial state in which the stopper portion 52 is in contact with the projection 40 and the cam portion 98 engages the limit switch 100 to be an OFF state is automatically set. Therefore, the initial position can be easily set without cumbersome adjustment of an incorporation position during an incorporating operation or cumbersome reset after the incorporating operation. In addition, moving control of the window glass can be reliably performed without an error.

In this case, in the position detection apparatus 90 according to the second embodiment, the limit switch 100 (terminal 102 and terminal 104) is arranged independently of the planetary gear combination (ring gear 92), and the limit switch 100 is operated by the cam portion 98 provided on the ring gear 92. Accordingly, the limit switch 100 can be operated without an influence of friction, vibration, or the like due to rotation of the ring gear 92, and a conduction failure caused by chattering, a shift of the set position, vibration, or the like can be prevented, thereby further improving reliability.

(Third Embodiment)

Figure 14:
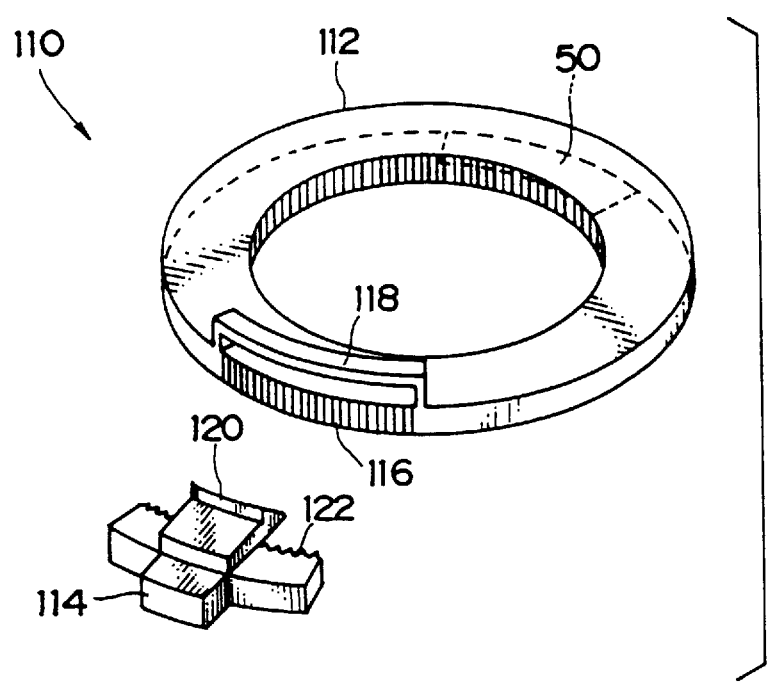
FIG. 14 is a perspective view showing a ring gear applied to a position detection apparatus according to the third embodiment of the present invention.

FIG. 14 shows a ring gear 112 constituting a planetary gear combination applied to a position detection apparatus 110 according to the third embodiment.

Although the ring gear 112 basically has the same arrangement as that of the ring gear 46 of the position detection apparatus 30 according to the first embodiment described above, the ring gear 112 also comprises an independent stopper portion 114. A tooth portion 116 having a predetermined pitch is formed in a portion of the periphery of the ring gear 112 by a knurlizer or the like. The pitch of the tooth portion 116 is set so as to correspond to an amount of movement of the window glass (e.g., 1 mm). In addition, an engaging frame 118 is integrally formed with one side surface of the ring gear 112 near the tooth portion 116.

The stopper portion 114 has a block-like shape as a whole, and an engaging pawl 120 is integrally formed with the stopper portion 114. The engaging pawl 120 is inserted into the engaging frame 118 to be engaged with the engaging frame 118, and the stopper portion 114 is integrally fixed to the ring gear 112. In the stopper portion 114, a tooth portion 122 is formed immediately below the engaging pawl 120. The tooth portion 122 is formed to have a predetermined pitch corresponding to the pitch of the tooth portion 116 of the ring gear 112, and can be meshed with the tooth portion 116. More specifically, when the engaging pawl 120 is engaged with the engaging frame 118, and the stopper portion 114 is integrally fixed to the ring gear 112, the tooth portion 122 is meshed with the tooth portion 116 to reliably prevent the relative movement between the stopper portion 114 and the ring gear 112. In addition, when the intermeshing position between the tooth portion 122 and the tooth portion 116 is changed, a timing at which the stopper portion 114 is brought into contact with the projection 40 to prevent further rotation of the ring gear 112 in the forward direction (in other words, timing at which a mobile contact 50 is brought into contact with fixed contacts 60 to be an ON state) can be arbitrarily changed.

In the ring gear 112 applied to the position detection apparatus 110 according to the third embodiment, when the ring gear 112 moves together with a sun gear 44 to reach a predetermined rotational position, the stopper portion 114 integrally fixed to the ring gear 112 is brought into contact with the projection 40 to prevent further rotation of the ring gear 112 in the forward direction, thereby making it possible to revolute the planetary gears 54. Therefore, transmission of forward torque from the sun gear 44 (shaft 20) to the ring gear 112 is interrupted.

In this case, in the ring gear 112, the fixing position of the stopper portion 114 can be changed by changing the intermeshing position between the tooth portion 116 and the tooth portion 122 of the stopper portion 114. For this reason, when the fixing position of the stopper portion 114 is changed, a timing at which the stopper portion 114 is brought into contact with the projection 40 to prevent rotation of the ring gear 112, thereby making it possible to revolute the planetary gears 54 can be arbitrarily changed.

Therefore, the position detection apparatus 110 can be easily applied to a power window apparatus, a sunroof apparatus, or the like of each of different types of vehicles (in other words, even if the set detection position of the shaft 20 detected by the mobile contact 50 varies). In addition, the set detection position can be arbitrarily changed, and a range to which the mobile member position detection apparatus is applied is widened, thereby reducing costs.

(Fourth Embodiment)

Figure 15:
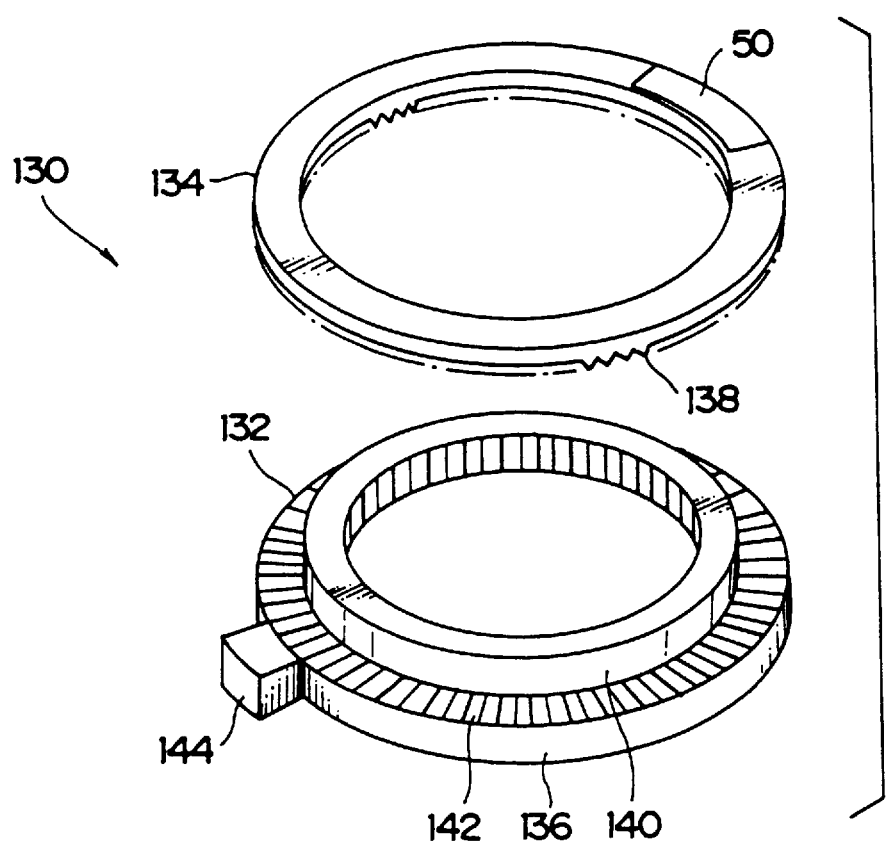
FIG. 15 is a perspective view showing a ring gear applied to a position detection apparatus according to the fourth embodiment of the present invention.

FIG. 15 shows a ring gear 132 constituting a planetary gear combination applied to a position detection apparatus 130 according to the fourth embodiment.

Although the ring gear 132 basically has the same arrangement as that of the ring gear 46 according to the first embodiment described above, the ring gear 132 also comprises a contact plate 134. The contact plate 134 is formed to have a ring-like shape corresponding to a flange portion 136 of the ring gear 132, and a mobile contact 50 is formed on the contact plate 134. A tooth portion 138 having a predetermined pitch is formed on the lower surface (surface opposing the flange portion 136) of the contact plate 134 along its peripheral direction. The pitch of the tooth portion 138, as in the third embodiment described above, is set to correspond to an amount of movement of a window glass. The inner diameter of the contact plate 134 corresponds to the outer diameter of a fit-in projection 140 of the ring gear 132. The fit-in projection 140 is press-fitted in the contact plate 134, thereby integrally fixing the contact plate 134 to the ring gear 132.

A tooth portion 142 is formed on the flange portion 136 of the ring gear 132. This tooth portion 142 is formed to have a predetermined pitch corresponding to the pitch of the tooth portion 138 of the contact plate 134, and can be meshed with the tooth portion 138. More specifically, when the contact plate 134 is press-fitted on the fit-in projection 140 to be integrally fixed to the ring gear 132, the tooth portion 142 is meshed with the tooth portion 138 to reliably prevent the relative movement between the ring gear 132 and the contact plate 134. In addition, when the intermeshing position between the tooth portion 142 and the tooth portion 138 is changed, a timing at which a stopper portion 144 of the ring gear 132 is brought into contact with the projection 40 to prevent further rotation of the ring gear 132 in the forward direction (in other words, timing at which a mobile contact 50 is brought into contact with fixed contacts 60 to be an ON state) can be arbitrarily changed.

In the ring gear 132 applied to the position detection apparatus 130 according to the fourth embodiment, when the ring gear 132 moves together with a sun gear 44 to reach a predetermined rotational position, the stopper portion 144 is brought into contact with the projection 40 to prevent further rotation of the ring gear 132 in the forward direction, thereby making it possible to revolute the planetary gears 54. Therefore, transmission of forward torque from the sun gear 44 (shaft 20) to the ring gear 132 is interrupted.

In this case, in the ring gear 132, the relative fixing position (in other words, the relative position between the stopper portion 144 and the mobile contact 50) between the ring gear 132 and the contact plate 134 can be changed by changing the intermeshing position between the tooth portion 142 and the tooth portion 138 of the contact plate 134. Accordingly, when the relative fixing position between the ring gear 132 and the contact plate 134 is changed, a timing at which the stopper portion 144 is brought into contact with the projection 40 to prevent rotation of the ring gear 132, thereby making it possible to revolute the planetary gears 54 can be arbitrarily changed.

Therefore, the position detection apparatus 130 can be easily applied to a power window apparatus, a sunroof apparatus, or the like of each of different types of vehicles (in other words, even if the set detection position of the shaft 20 detected by the mobile contact 50 varies). In addition, the set detection position can be arbitrarily changed, and a range to which the mobile member position detection apparatus is applied is widened, thereby reducing costs.

(Fifth Embodiment)

Figure 16:
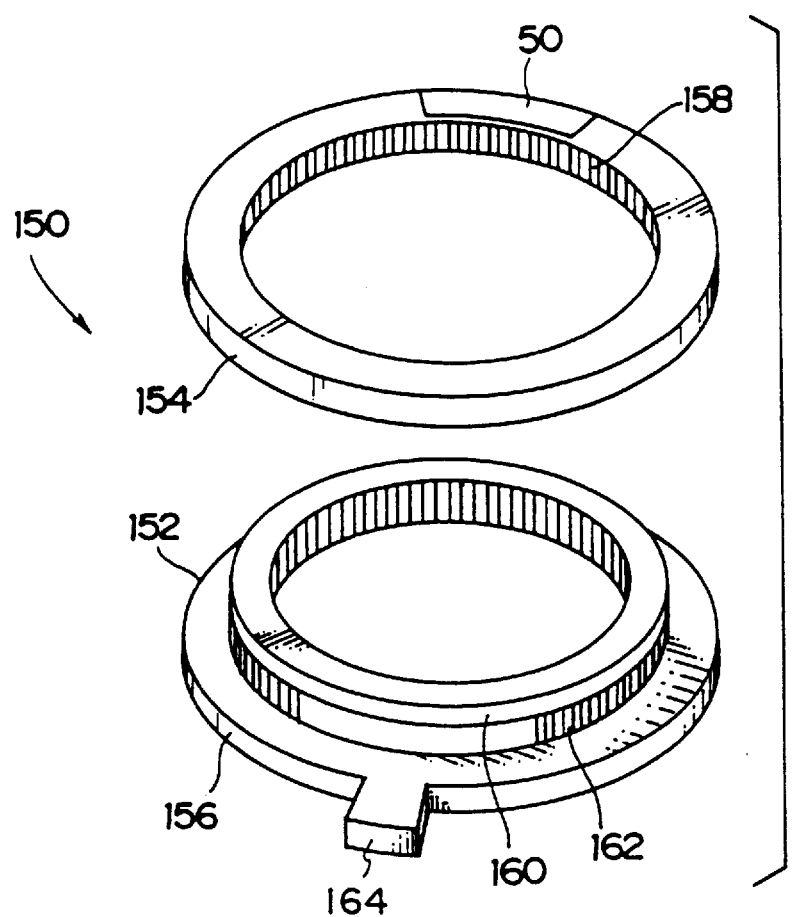
FIG. 16 is a perspective view showing a ring gear applied to a position detection apparatus according to the fifth embodiment of the present invention.

FIG. 16 shows a ring gear 152 constituting a planetary gear combination applied to a position detection apparatus 150 according to the fifth embodiment.

Although the ring gear 152 basically has the same arrangement as that of the ring gear 132 according to the fourth embodiment described above, the ring gear 152 also comprises a contact plate 154. The contact plate 154 is formed to have a ring-like shape corresponding to a flange portion 156 of the ring gear 152, and a mobile contact 50 is formed on the contact plate 154. A tooth portion 158 having a predetermined pitch is formed on the inner peripheral surface of the contact plate 154 along its peripheral direction. The pitch of the tooth portion 158, as in the fourth embodiment described above, is set to correspond to an amount of movement of a window glass. The inner diameter of the contact plate 154 corresponds to the outer diameter of a fit-in projection 160 of the ring gear 152. The fit-in projection 160 is press-fitted in the contact plate 154, thereby integrally fixing the contact plate 154 to the ring gear 152.

A tooth portion 162 is formed on the peripheral wall of the fit-in projection 160 of the ring gear 152. This tooth portion 162 is formed to have a predetermined pitch corresponding to the pitch of the tooth portion 158 of the contact plate 154, and can be meshed with the tooth portion 158. More specifically, when the contact plate 154 is press-fitted on the fit-in projection 160 to be integrally fixed to the ring gear 152, the tooth portion 162 is meshed with the tooth portion 158 to reliably prevent the relative movement between the ring gear 152 and the contact plate 154. In addition, when the intermeshing position between the tooth portion 162 and the tooth portion 158 is changed, a timing at which a stopper portion 164 of the ring gear 152 is brought into contact with the projection 40 to prevent further rotation of the ring gear 152 in the forward direction can be arbitrarily changed.

In this case, in the ring gear 152 applied to the position detection apparatus 150 according to the fifth embodiment, the relative fixing position (in other words, the relative position between the stopper portion 164 and the mobile contact 50) between the ring gear 152 and the contact plate 154 can be changed by changing the intermeshing position between the tooth portion 162 and the tooth portion 158 of the contact plate 154. For this reason, when the relative fixing position between the ring gear 152 and the contact plate 154 is changed, a timing at which the stopper portion 164 is brought into contact with the projection 40 to prevent rotation of the ring gear 152, thereby making it possible to revolute the planetary gears 54 can be arbitrarily changed.

Figure 17:
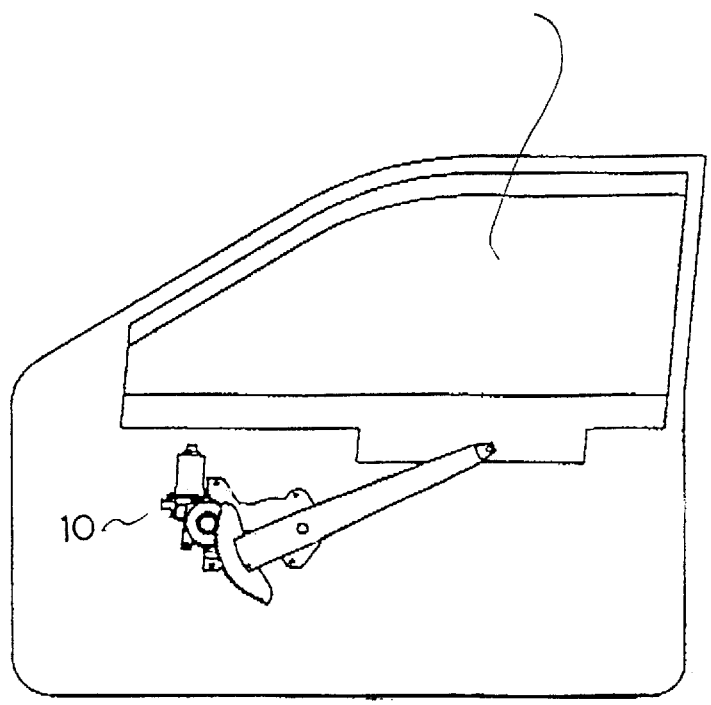
FIG. 17 illustrates a mobile member position detecting apparatus according the present invention applied to a power window apparatus.
Figure 18:
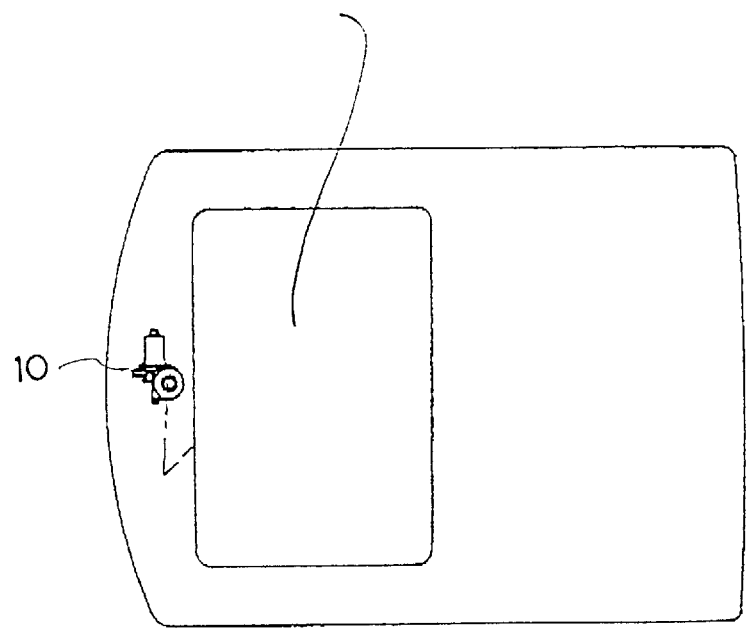
FIG. 18 illustrates a mobile member position detecting apparatus according the present invention applied to a sunroof apparatus.

Therefore, the position detection apparatus 150 can be easily applied to a power window apparatus (see FIG. 17), a sunroof apparatus (see FIG. 18), or the like of each of different types of vehicles (in other words, even if the set position of the shaft 20 detected by the mobile contact 50 varies). In addition, the set detection position can be arbitrarily changed, and a range to which the mobile member position detection apparatus is applied is widened, thereby reducing costs.

Each of the first to fifth embodiments describes that the position detection apparatus 30, 90, 110, 130, or 150 is directly applied to the motor 10 for a power window apparatus. However, the position detection apparatus 30, 90, 110, 130, or 150 is not only directly applied to the motors 10, but also can be applied to another mechanism or portion. For example, each of these position detection apparatuses may be applied to an arm rotation support shaft of an X-arm type window regulator apparatus, or to a pulley for training a wire of a wire type window regulator apparatus. In these cases, high-accuracy detection of the position of a window glass and high-accuracy moving control of the window can be performed. Further, an initial position can be easily set without cumbersome adjustment of an incorporation position during an incorporating operation or cumbersome reset after the incorporating operation.

Furthermore, each of the first to fifth embodiments describes that the position detection apparatus 30, 90, 110, 130, or 150 is controlled by detecting the rotational position of the output shaft (shaft 20) of the motor 10 for a power window apparatus. However, the present invention is not limited to these embodiments, and the present invention can also be applied to a case wherein a position detection apparatus is controlled by detecting the moving position of a mobile member (e.g., a sunroof or the like moving on a guide rail) which is linearly reciprocated.

As has been described above, the present invention has the following effects.

In a mobile member position detection apparatus according to the present invention, a predetermined moving position of a mobile member can be detected with high accuracy. When the mobile member position detection apparatus is applied to a power window apparatus (see FIG. 17) or a sunroof apparatus (see FIG. 18), the position of a window glass or a sunroof can be detected with high accuracy, and high-accuracy moving control can be performed. In addition, an initial position can be easily set without cumbersome adjustment of an incorporation position during an incorporating operation or cumbersome reset after the incorporating operation, and this setting can be realized by a simple structure at low cost. Force for preventing revolution of planetary gears is increased to increase torque which can be transmitted from a rotational drive source to a ring gear, and transmission (moving together with the ring gear) of moving force can be reliably performed, thereby accurately operating a switch unit.

While the embodiments of the present invention as herein disclosed, constitute a preferred form, it is to be understood that other forms might be adopted.

What is claimed is:

1. A mobile member position detection apparatus for detecting a predetermined moving position of a mobile member moving in a forward/backward direction, comprising:

a switch unit for detecting the predetermined moving position of said mobile member on the basis of an ON/OFF-operation of a contact;

a planetary gear combination, having a ring gear and a planetary gear and moved together with said mobile member by moving force transmitted from said mobile member, for causing said ring gear to operate said switch unit at the predetermined moving position of said mobile member;

a clutch mechanism for transmitting the moving force of said rotational drive source from said planetary gear to said ring gear by preventing revolution of said planetary gear in a normal state to rotate said ring gear, and further for allowing revolving movement of said planetary, thereby interrupting transmission of forward torque from said mobile member to said ring gear after said switch unit operates, when said ring gear is rotated in the forward direction by a predetermined amount; and a torque increasing mechanism, arranged in the planetary gear combination, for increasing force for preventing revolution of said planetary gear by said clutch mechanism, whereby torque which can be transmitted from said mobile member to said ring gear is increased.

2. A mobile member position detection apparatus according to claim 1, wherein said ring gear of said planetary gear combination further has a stopper portion formed thereon, and said stopper portion is brought into contact with a projection formed at a position where said ring gear is rotated from an arrangement position of said switch unit by a predetermined amount in the forward direction to make it possible to revolute said planetary gear, thereby interrupting the transmission of the forward torque from said mobile member to said ring gear.

3. A mobile member position detection apparatus according to claim 2, wherein an operating position of said stopper portion formed on said ring gear of said planetary gear combination is selectively changeable so as to change a timing at which the transmission of the forward torque from said mobile member to said ring gear is interrupted.

4. A mobile member position detection apparatus according to claim 1, wherein said switch unit is constituted by a fixed contact provided independently of said planetary gear combination and a mobile contact integrally provided with said ring gear of said planetary gear combination, and said switch unit is operated such that said fixed contact and said mobile contact are brought into contact with each other at the predetermined moving position of said mobile member.

5. A mobile member position detection apparatus according to claim 1, wherein said switch unit is provided independently of said planetary gear combination, a cam portion which can be engaged with said switch unit is integrally provided with said ring gear of said planetary gear combination, and said switch unit is operated such that said cam portion is engaged with said switch unit at the predetermined moving position of said mobile member.

6. A mobile member position detection apparatus according to claim 1, wherein said clutch mechanism includes a wave washer.

7. A mobile member position detection apparatus according to claim 1, wherein said mobile member is an output shaft connected to a rotational drive source.

8. A mobile member position detection apparatus for detecting a predetermined moving position of a mobile member moved between a first position and a second position by drive force from a rotational drive source rotated in a forward/backward direction, comprising:

a switch unit for detecting the predetermined moving position of said mobile member on the basis of an ON/OFF-operation of a contact;

a planetary gear combination, having a ring gear and a planetary gear and moved together with said mobile member by torque transmitted from said rotational drive source, for causing said ring gear to operate said switch unit at the predetermined moving position of said mobile member, said planetary gear combination further for transmitting the torque of said rotational drive source from said planetary gear to said ring gear in a normal state by preventing revolution of said planetary gear, and for interrupting the transmission of the forward torque from said rotational drive source to said ring gear by said planetary gear revolving to thereby stop rotation of said ring gear, when said ring gear is rotated by a predetermined amount in the forward direction, after said switch unit operates, wherein said rotational drive source is rotated in the forward direction to move said mobile member to the first position in the forward direction, thereby causing the stop position of the rotation of said ring gear to correspond to the first position of said mobile member; and a torque increasing mechanism, arranged in the planetary gear combination, for increasing force for preventing revolution of said planetary gear by a clutch mechanism, whereby torque which can be transmitted from said mobile member to said ring gear is increased.

9. A mobile member position detection apparatus according to claim 8, wherein said ring gear of said planetary gear combination further has a stopper portion formed thereon, and said stopper portion is brought into contact with a projection formed at a position where said ring gear is rotated from an arrangement position of said switch unit by a predetermined amount in the forward direction to make it possible to revolute said planetary gear, thereby interrupting transmission of forward torque from said rotational drive source to said ring gear.

10. A mobile member position detection apparatus according to claim 9, wherein an operating position of said stopper portion formed on said ring gear of said planetary gear combination is selectively changeable so as to change a timing at which the transmission of the forward torque from said rotational drive source to said ring gear is interrupted.

11. A mobile member position detection apparatus according to claim 8, wherein said switch unit is constituted by a fixed contact provided independently of said planetary gear combination and a mobile contact integrally provided with said ring gear of said planetary gear combination, and said switch unit is operated such that said fixed contact and said mobile contact are brought into contact with each other at the predetermined moving position of said mobile member.

12. A mobile member position detection apparatus according to claim 8, wherein said switch unit is provided independently of said planetary gear combination, a cam portion which can be engaged with said switch unit is integrally provided with said ring gear of said planetary gear combination, and said switch unit is operated such that said cam portion is engaged with said switch unit at the predetermined moving position of said mobile member.

13. A mobile member position detection apparatus according to claim 8, wherein said planetary gear combination further comprises a gear base for pivotally supporting said planetary gear, and said torque increasing mechanism is a clutch unit arranged in said gear base.

14. A mobile member position detection apparatus according to claim 8, wherein said mobile member is a window glass, and the first position is a close position of said window glass, and the second position is an open position of said window glass.

15. A mobile member position detection apparatus according to claim 14, wherein a predetermined amount of rotation of said ring gear corresponds to a 4-mm moving distance of said window glass.

16. A mobile member position detection apparatus according to claim 8, wherein said mobile member is a sunroof of a vehicle, the first position is a close position said sunroof, and the second position is an open position of said sunroof.

17. A mobile member position detection apparatus for detecting a predetermined moving position of a mobile member moved between a first position and a second position by drive force from a rotational drive source rotated in a forward/backward direction, comprising:

a switch unit which can detect the predetermined moving position of said mobile member on the basis of an ON/OFF-operation of a contact;

a planetary gear combination, having a ring gear and a planetary gear and moved together with said mobile member by torque transmitted from said rotational drive source, for causing said ring gear to operate said switch unit at the predetermined moving position of said mobile member, said planetary gear combination for transmitting the torque of said rotational drive source from said planetary gear to said ring gear in a normal state by preventing revolution of said planetary gear, and for interrupting the transmission of the forward torque from said rotational drive source to said ring gear by making it possible to revolute said planetary gear to stop rotation of said ring gear, when said ring gear is rotated by a predetermined amount in the forward direction, after said switch unit operates, in the case that said rotational drive source is rotated in the forward direction to move said mobile member to the first position in the forward direction, thereby causing the stop position of the rotation of said ring gear to correspond to the first position of said mobile member; and a torque increasing mechanism, arranged in said planetary gear combination, for increasing force for preventing revolution of said planetary gear to increase torque which can be transmitted from said rotational drive source to said ring gear.

18. A mobile member position detection apparatus according to claim 17, wherein said planetary gear combination further comprises a gear base for pivotally supporting said planetary gear, and said torque increasing mechanism is a clutch unit arranged in said gear base.

19. A mobile member position detection apparatus according to claim 17, wherein said ring gear of said planetary gear combination further has a stopper portion formed thereon, and said stopper portion is brought into contact with a projection formed at a position where said ring gear is rotated from an arrangement position of said switch unit by a predetermined amount in the forward direction to make it possible to revolute said planetary gear, thereby interrupting transmission of forward torque from said rotational drive source to said ring gear.

20. A mobile member position detection apparatus according to claim 18, an operating position of said stopper portion formed on said ring gear of said planetary gear combination is selectively changeable so as to change a timing at which the transmission of the forward torque from said rotational drive source to said ring gear is interrupted.

21. A mobile member position detection apparatus according to claim 17, wherein said mobile member is a window glass, and the first position is a close position of said window glass, and the second position is an open position of said window glass.

22. A mobile member position detection apparatus for detecting a predetermined moving position of a mobile member that moves between a first position and a second position by drive force from a rotational drive source that rotates in forward and backward directions, comprising:

switch means for detecting the predetermined moving position of the mobile member based on ON/OFF-operation of a contact;

a planetary gear combination, having a ring gear and a planetary gear and moved together with the rotational drive source through rotating force transmitted from the rotational drive source, for causing the ring gear to operate said switch means at the predetermined moving position of said mobile member; and clutch means for transmitting the rotating force of the rotational drive source from the planetary gear to the ring gear by preventing the planetary gear from revolving in a normal state thereby rotating the ring gear, the clutch means including a torque increasing mechanism for increasing force to prevent the planetary gear from revolving, wherein when the rotational drive source is rotated in the forward direction so that the mobile member moves in the forward direction by operation of said clutch means to the first position, after said switch means is operated, when the ring gear is rotated in the forward direction by a predetermined amount, revolution of the planetary gear is allowed and the transmission of forward torque from the rotational drive source to the ring gear is interrupted so as to stop the rotation of the ring gear, thereby causing the stop position of the rotation of the ring gear to correspond to the first position of the mobile member, and adjusting the relative positions of said switch means and the mobile member that moves together with the rotational drive source.

23. A mobile member position detection apparatus according to claim 1, wherein said torque increasing mechanism is formed at a supporting member of said planetary gear.

24. A mobile member position detection apparatus according to claim 8, wherein said torque increasing mechanism is formed at a supporting member of said planetary gear.

25. A mobile member position detection apparatus according to claim 22, wherein said torque increasing mechanism is formed at a supporting member of said planetary gear.

* * * * *